Patented Feb. 11, 1941

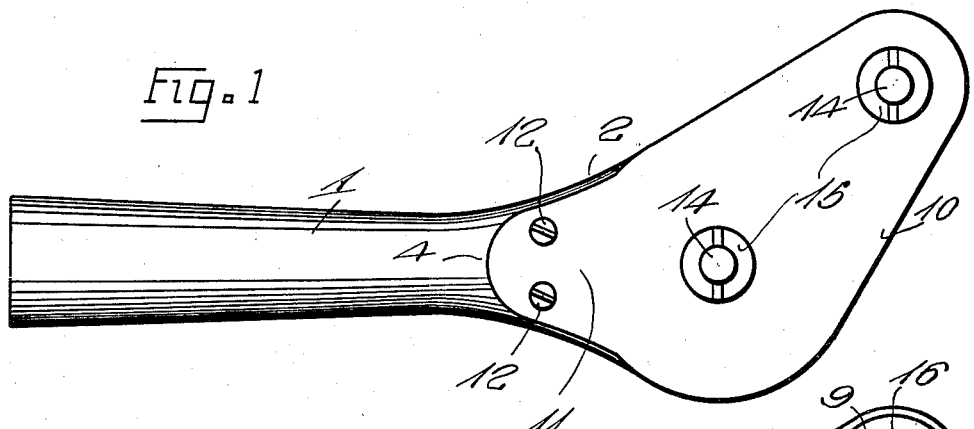
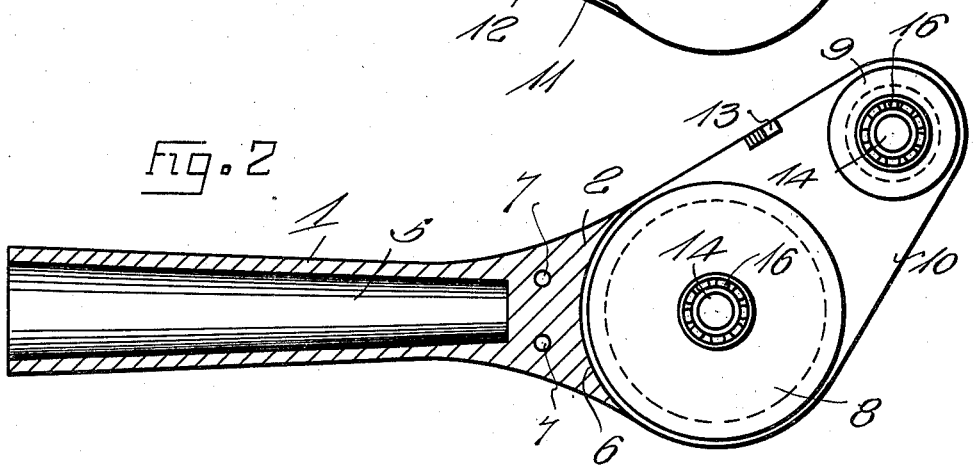
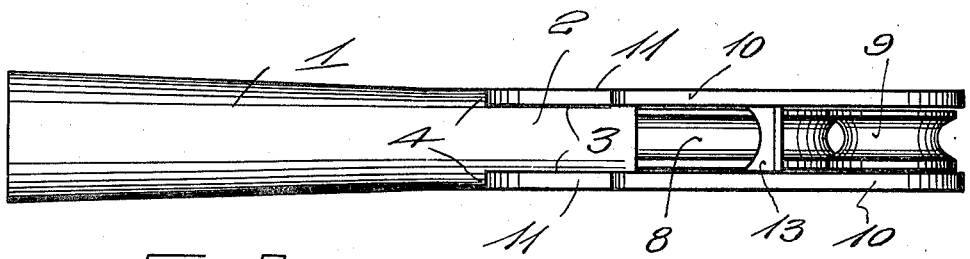
Inventor:-
William P. Byrd

2,231,053

UNITED STATES PATENT OFFICE 2,231,053

FISHING ROD TIP

William P. Byrd, Miami, Fla.

Application May 26, 1939, Serial No. 275,987

1 Claim. (Cl. 43—24)

This invention relates to a fishing rod tip and it is one object of the invention to provide a tip of such formation that a line will run freely through it without fouling and without backlashing.

Another object of the invention is to provide the tip with wheels or rollers having ball bearings so that they may turn very freely and reduce friction upon the line.

Another object of the invention is to provide a tip having the wheels or rollers so arranged that while it will be normally engaged with a large rear wheel it may engage a small front roller when necessary.

Another object of the invention is to provide the tip with mounting plates for the rollers or wheels, these plates being firmly mounted at opposite sides of a shank but so mounted that they may be removed when repairs or a thorough cleaning is necessary.

Another object of the invention is to provide a tip of such construction that a line may be easily reeled in, thus making it easy to land a fish.

Another object of the invention is to provide a tip formed entirely of stainless steel or other suitable metal which will not rust and be of light weight but, at the same time, very strong and durable.

Another object of the invention is to produce a tip of simple design which may be manufactured at low cost and sold at a reasonable price.

The invention is illustrated in the accompanying drawing, wherein:

Figure 1 is a side elevation of the improved tip.

Figure 2 is a view showing the tip partially in longitudinal section and partially in elevation.

Figure 3 is a view looking down on Figure 1.

This improved fishing rod tip has a shank 1 which tapers toward its front end and at its front end is enlarged to form a head 2 of greater width than the shank. This head is of reduced thickness, as shown in Figure 3, to provide recesses 3 having shoulders 4 at their rear ends. The shank is hollow, as shown in Figure 2, thus providing a socket 5 tapered toward its front end and adapted to receive the front end portion of a fishing rod to which the tip will be firmly secured by cement or in any other desired manner. At its front end, the head 2 is formed with a longitudinally arcuate concave front edge face 6 and between this front edge face and the pocket 5, the head is formed with fastener-receiving sockets 7.

In order to mount the wheels or rollers 8 and 9, there have been provided side plates 10 which are substantially triangular and taper toward their front and rear ends. The rear end portions of these side plates are reduced somewhat in width to provide tongues 11 which are detachably secured against the flat side faces of the head 2 by bolts, screws or equivalent fasteners 12 passed through openings formed in the tongues and engaged in the sockets 7.

A bridge 13 extends between the plates intermediate the length thereof, a shown in Figures 2 and 3, and may be formed integral with one plate, as shown, or separate therefrom and detachably secured in any desired manner. The rollers or wheels are carried by axles 14 which pass through openings formed in the side plates 10 and carry securing nuts 15 for holding them in place. Within the hub portions of the wheels are ball bearings 16 provided in order that the wheels will turn freely and thus permit a fish line to run freely when casting or reeling in and also eliminate frictional wear on the line as it is moving across a rotatably mounted wheel instead of sliding across a stationary surface.

Normally the line is in engagement with the large rear wheel 8 which is spaced quite a distance from the small front wheel and, for a portion of its circumference, is in close parallel relation to the concave front edge face of the head 2, but, at times, the line will engage both wheels or only the front wheel. As all the elements are made of stainless steel which is chromium plated, the tip will be very strong and durable, of light weight, and of neat and attractive appearance. While its elements will be firmly mounted in cooperating relation to each other, they may be easily taken apart when repairs or a thorough cleaning is necessary. The small wheel serves as a guide for a line, but if the rod is turned by the weight of a reel or the pull of a fish, the small wheel will then serve as a rotatable bearing surface.

Having thus described the invention, what is claimed is:

In a fishing rod tip, a shank adapted to be mounted upon a rod, a wide head at the front end of said shank formed integral therewith and having a concaved longitudinally arcuate front edge face, said head having flat side faces and transversely extending shoulders at rear ends thereof, substantially triangular side plates tapered towards their front and rear ends and having their end portions reduced in width to form tongues, fasteners removably securing said tongues flat against the side faces of said head with their ends abutting said shoulders, said plates extending forwardly from the head diagonally of the shank, a bridge carried by one plate and extending between the plates intermediate the head and front ends of the plates and bearing against the other side plate, a large line-engaging wheel disposed between said plates in close proximity to the arcuate front edge face of said head, a small wheel between front end portions of said plates in advance of and in upwardly offset relation to the rear wheel, and axles for said wheels carried by said plates.

WILLIAM P. BYRD.